(12) United States Patent
Bhaskaran

(10) Patent No.: US 8,059,644 B2
(45) Date of Patent: *Nov. 15, 2011

(54) APPLICATION FOR NON DISRUPTIVE TASK MIGRATION IN A NETWORK EDGE SWITCH

(75) Inventor: Sajit Bhaskaran, Sunnyvale, CA (US)

(73) Assignee: Aspen Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,091

(22) Filed: Oct. 16, 2009

(65) Prior Publication Data

US 2010/0111083 A1    May 6, 2010

(51) Int. Cl.
*H04L 12/28* (2006.01)
(52) U.S. Cl. ....................................................... 370/389
(58) Field of Classification Search .................. 370/389, 370/392, 219, 218, 220, 221, 225, 228, 252, 370/395.31
See application file for complete search history.

(56) References Cited

U.S. PATENT DOCUMENTS

| | | | |
|---|---|---|---|
| 6,628,617 B1 * | 9/2003 | Karol et al. | 370/237 |
| 6,711,153 B1 | 3/2004 | Hebb et al. | |
| 6,807,156 B1 | 10/2004 | Veres et al. | |
| 6,813,242 B1 | 11/2004 | Haskin et al. | |
| 6,829,237 B2 | 12/2004 | Carson et al. | |
| 6,885,635 B1 | 4/2005 | Haq et al. | |
| 6,894,970 B1 | 5/2005 | McDermott et al. | |
| 6,990,063 B1 | 1/2006 | Lenoski et al. | |
| 6,990,103 B1 * | 1/2006 | Gollamudi | 370/395.31 |
| 7,006,431 B1 | 2/2006 | Kanekar et al. | |
| 7,068,661 B1 | 6/2006 | Watt et al. | |
| 7,139,928 B1 | 11/2006 | Bhattacharya et al. | |
| 7,164,661 B2 | 1/2007 | Kelly | |
| 7,263,099 B1 | 8/2007 | Woo et al. | |
| 2002/0097672 A1 | 7/2002 | Barbas et al. | |
| 2003/0137980 A1 | 7/2003 | Jung | |
| 2003/0198182 A1 | 10/2003 | Pegrum et al. | |
| 2003/0227920 A1 | 12/2003 | Benayoun et al. | |
| 2004/0042393 A1 | 3/2004 | Minhazuddin et al. | |
| 2005/0083833 A1 | 4/2005 | Gettala et al. | |
| 2005/0111445 A1 | 5/2005 | Wybenga et al. | |
| 2006/0221948 A1 | 10/2006 | Benner et al. | |

OTHER PUBLICATIONS

Notice of Allowance, Sep. 24, 2009.
Office Action, Apr. 3, 2009.
Office Action, Mar. 27, 2009.
Notice of NonCompliant Amendment, Dec. 31, 2008.
Office Action, Mar. 27, 2008.
Office Action, Oct. 15, 2007.
Office Action, Feb. 1, 2007.

* cited by examiner

*Primary Examiner* — Chi Pham
*Assistant Examiner* — Alexander Boakye
(74) *Attorney, Agent, or Firm* — Orrick, Herrington Sutcliffe, LLP

(57) ABSTRACT

An apparatus and a method are described for zero packet loss task migration in an network switch in a computer network. The invention relates to active or programmable networks, i.e. networks based on packet switching algorithms and switch configurations which are subject to change. A well-defined protocol enables an intelligent switch to migrate tasks from one forwarding engine to another without any packet loss. This enables the algorithms and configurations of the switch to be updated or modified arbitrarily.

4 Claims, 19 Drawing Sheets

Before migrate

|  | X (Fwd) | Y (Blocked) |
| --- | --- | --- |
| New address learning | active | blocked |
| Unknown unicast flood | yes | no |
| Multicast flood | yes | no |
| Real address forwarding | Enabled, no translation | disabled |
| Shadow address forwarding | disabled | disabled |

FIG. 7A

After the Migrate FWD(2) command is sent by Y, Y makes the following state change.

|  | X (Fwd) | Y (Blocked) |
| --- | --- | --- |
| New address learning | active | blocked |
| Unknown unicast flood | yes | no |
| Multicast flood | yes | no |
| Real address forwarding | Enabled, no translation | Enabled, no translation |
| Shadow address forwarding | disabled | enabled |

FIG. 7B

After the Migrate Ack(3) command is sent by X, the following state exists:

|  | X (Fwd) | Y (Blocked) |
| --- | --- | --- |
| New address learning | blocked | blocked |
| Unknown unicast flood | no | no |
| Multicast flood | no | no |
| Real address forwarding | Enabled, with translation | Enabled, no translation |
| Shadow address forwarding | disabled | enabled |

FIG. 7C

After the Migrate Ack(3) command is received by Y, the following state change is made at Y:

|  | X (Fwd->Blocked) | Y (Blocked->Fwd) |
| --- | --- | --- |
| New address learning | blocked | active |
| Unknown unicast flood | no | yes |
| Multicast flood | no | yes |
| Real address forwarding | Enabled, with translation | Enabled, no translation |
| Shadow address forwarding | disabled | enabled |

FIG. 7D

Portion of Forwarding Table in X

| Mac-address | Primary port | Shadow mac address | Real address |
|---|---|---|---|
| m | Output port for forwarding during premigrate (normal) | described below as sh (m) = some label L | Null entry (entry only applicable on Y when doing 2nd hop translation back to real address) |

FIG. 8A

Portion of Forwarding Table in Y

| Mac-address | Primary port | Shadow mac address | Real address |
|---|---|---|---|
| sh(m) | Output port = In port during migrate | null | m (entry only applicable on Y when doing 2nd hop translation back to real address) |

APPLICATION FOR NON DISRUPTIVE TASK MIGRATION IN A NETWORK EDGE SWITCH

This application claims priority to U.S. patent application Ser. No. 10/317,809, filed on Dec. 11, 2002 and the contents of which are hereby incorporated by reference as if fully set forth herein.

CROSS-REFERENCE TO APPENDIX

Appendix A, which is part of the present disclosure, contains exemplary control message formats for an Ethernet packet switch, in accordance to some embodiments of the present invention. Appendix A contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to computer networks and, more specifically, to active or programmable networks, i.e., networks based on datagram based packet switching algorithms and switch configurations, which are subject to constant change over time. In datagram-based packet switching, packets are switched and routed independently of each other.

2. Related Art

Network switches are an integral part of a computer network and are essential in ensuring that data distributed through networks properly reaches its destination. As computer networks continue to evolve, the functionality and complexity of network switches have also evolved and they have become more intelligent. The algorithms controlling the behavior of switches continue to mature as the demands of network applications increase.

A network edge switch is a packet switch that: (1) partitions the network end nodes spatially into two mutually exclusive sets A={a[1], ..., a[p]} and N={n[1], ..., n[q]}, where each of a[i] and n[j] is an end node and p and q are positive integers; and (2) performs packet forwarding functions for traffic between A and N, that is, for traffic microflows of the form a[i]→n[j] and n[j]→a[i].

In prior art switches, an algorithm or a configuration change in a switch was performed (consciously) by the administrator who must schedule a down time for the switch. Unfortunately, the switch was unable to perform its functions while the code is changed and/or the configuration data is modified. As a result, datagrams normally handled by the switch must be routed through an alternate switch during the upgrade to prevent data loss. This kind of re-routing usually results in a period of instability involving datagram loss, datagram re-ordering and/or datagram duplication, all of which are disruptive to applications running on host computers connected to these networks.

In cases where no such alternative routing is possible, down time must be scheduled for the network. Even packet switch down time scheduled well in advance can be very costly, especially in today's high-speed networks. As a result, network administrators try to minimize down time as much as possible.

In networks where network, transport, session and/or application layer switching is performed, there are many circumstances that require a code or configuration change. For example, as forwarding algorithms (e.g., firewalls, virus scans and intrusion detection) in switches evolve, the meaning of commercially acceptable quality changes. Thus, network switch customers constantly update these algorithms, either manually or via automated network management. Furthermore, the configuration files in network switches need to be periodically updated without disrupting any application traffic through datagram loss, reordering or duplication. Datagram loss for more than a few hundred milliseconds causes a severe degradation in quality, even for a single subscriber session, and can render network service unacceptable for many network applications, such as real-time voice over IP. For switches deployed in service provider networks with large numbers of subscriber sessions, even a tiny amount of datagram loss has an unacceptable impact on subscriber revenue or satisfaction.

A key aspect of the related art is the management and control of any packet switch. It is critical that the switch be viewed as a single system by the administrator, who has to manage it by executing commands at a console. Managing multiple systems is cumbersome and expensive, compared to managing a single system that can perform all the functions of the multiple system alternative; hence in packet switching the requirement for a "single system" view has evolved. A system can be considered a "single system" view for management purposes when one or more of the following conditions are met:

a. the system has a single enclosure requiring at most a single power source, and if the box enclosure has status LEDs on any of its panels, the system should not require more than a single LED that indicates whether the packet forwarding logic inside the enclosure is Up (operational) or Down (non operational);

b. the system requires at most a single asynchronous serial communications port (such as a modem or console port) for control and management commands to be issued. Examples of such commands include MIGRATE TASK, UPDATE ALGORITHM and the like;

c. the system when managed by the industry standard SNMP protocol must require at most a single IP address for SNMP management stations to monitor it, and in a visual display on such a management station the system must appear as a single icon labeled with a single name and a single IP address;

d. the system when managed by other IP based terminal programs (such as TELNET or SSH) requires at most a single IP address;

e. the system if managed by any Layer 2 Ethernet based network management scheme that may be defined in future, requires at most a single unicast Ethernet MAC address;

f. the system requires a single set of configuration parameters, some or all of which have a dependency relationship on each other; this single set of possibly inter-related parameters defines a coherent personality for the switch being configured.

SUMMARY OF THE INVENTION

The present invention provides a network edge switch that allows code and/or configuration changes to be performed with zero down time and zero application disruption (i.e., no datagram loss, no datagram reordering and no datgaram duplication)—and which does present a "single system" view to a network administrator who will control and manage the switch. Such changes can be performed at any time and at an arbitrarily high frequency, and can be initiated by a human or by a programmed automated process.

This is accomplished by having at least two forwarding engines within the packet switch controlled by a control processor. A well-defined protocol among these elements allows the control processor to direct task migration from one forwarding engine to a second forwarding engine with no disruption to applications. Packets which initially flow through the first forwarding engine are migrated to the second forwarding engine that can be running different code or have a different configuration.

BRIEF DESCRIPTION OF THE DRAWINGS

FIGS. 7A-7D are representations of the internal states of FE X and FE Y of FIG. 1 at different stages before, during and after the task migration process.

FIGS. 8A-B are representations of the internal shadow forwarding tables of FE X and FE Y of FIG. 1.

DETAILED DESCRIPTION OF THE INVENTION

The present invention in accordance with some embodiments of a network edge switch allows tasks to migrate from one Forwarding Engine (FE) to another FE with no application disruption via messages that synchronize address forwarding tables, establish a microflow to enable packet routing during the transition from one FE to another, and complete and terminate the task migration process without application disruption.

The invention is applicable to any device that installs and operates as an edge switch for a packet-switched network, including, for example, a transparent Ethernet switch, that performs various packet transformations at Layer 2 (e.g., Ethernet) in the OSI reference model or at multiple layers (Layers 2 through 7).

Figure 1:
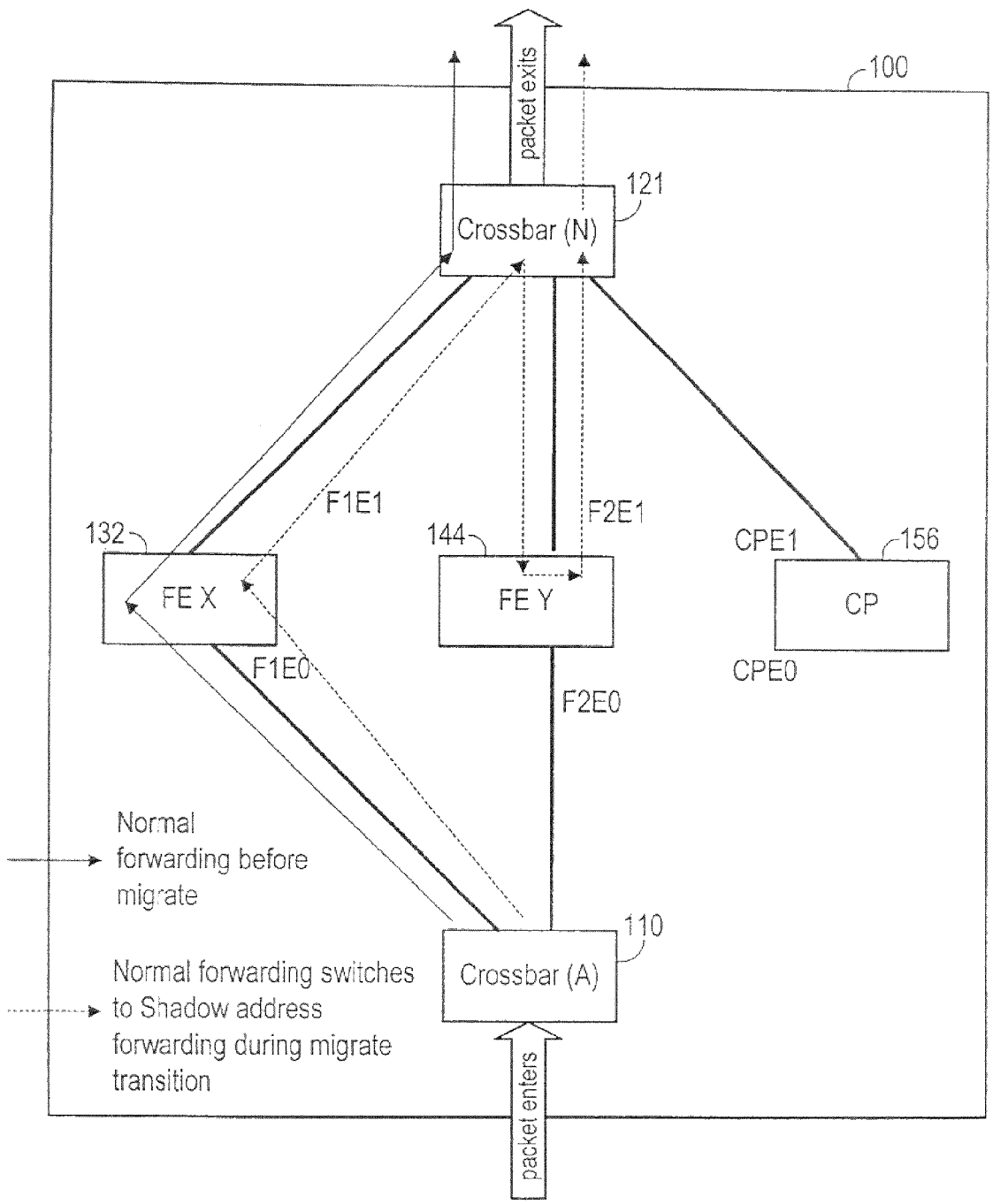
FIG. 1 is a block diagram of a packet switch capable of application non-disruptive task migration, in accordance with some embodiments of the invention.

A block diagram view of packet switch 100 capable of application non-disruptive task migration is shown in FIG. 1. Crossbar (A) 110 represents the Access side of switch 100, Crossbar (N) 121 represents the Network side and data flow is shown for packets which arrive at Crossbar (A) 110 and leave through Crossbar (N) 121. For simplicity, the figure only shows data flow in this one direction, but data flows occur identically in both directions and the techniques described herein apply to data in both directions. The N side ports and the A side ports typically connect to two different special purpose networks, or to separately managed networks, which may often have different owners. The two boxes marked FE 132 and FE 144 are each forwarding engines, which are any computational entity that performs packet forwarding tasks. The box labeled CP is the Control Processor 156, which controls the task migration. The bold solid lines show the interconnections among the components.

In FIG. 1, the solid arrows indicate the data flow during normal packet forwarding through FE 132, prior to any task migration. The administrator would migrate the task from FE 132 to FE 144, change the algorithms or configuration data in FE 132, either manually or automatically. The administrator could then optionally test FE 132 from CP 156 since the old algorithms and configuration data has been migrated to FE 144 in an orderly and application non-disruptive manner. The dashed arrows illustrate the microflows which are set up to allow the flow of packets during the transition of tasks from FE 132 to FE 144. Following completion of the task migration, data packets would flow directly through FE 144.

In a normal application, after FE 132 has been updated with the changes and tested, CP 156 sends instructions to FE 144 and FE 132 to begin a second migration of tasks from FE 144 back to FE 132 that is non-disruptive to applications.

While the embodiment illustrated in FIG. 1 uses two Forwarding Engines to perform the task migration, an arbitrarily large number of Forwarding Engines may be used in packet switch 100 in accordance with the principles of the present invention. In some embodiments, all or any subset of the different components shown in switch 100 may be contained within a single chip, or spread out among multiple chips. While an Ethernet edge switch is described herein as an example, the principles of the present invention are easily applied to any packet-based network edge switch.

Figure 3:
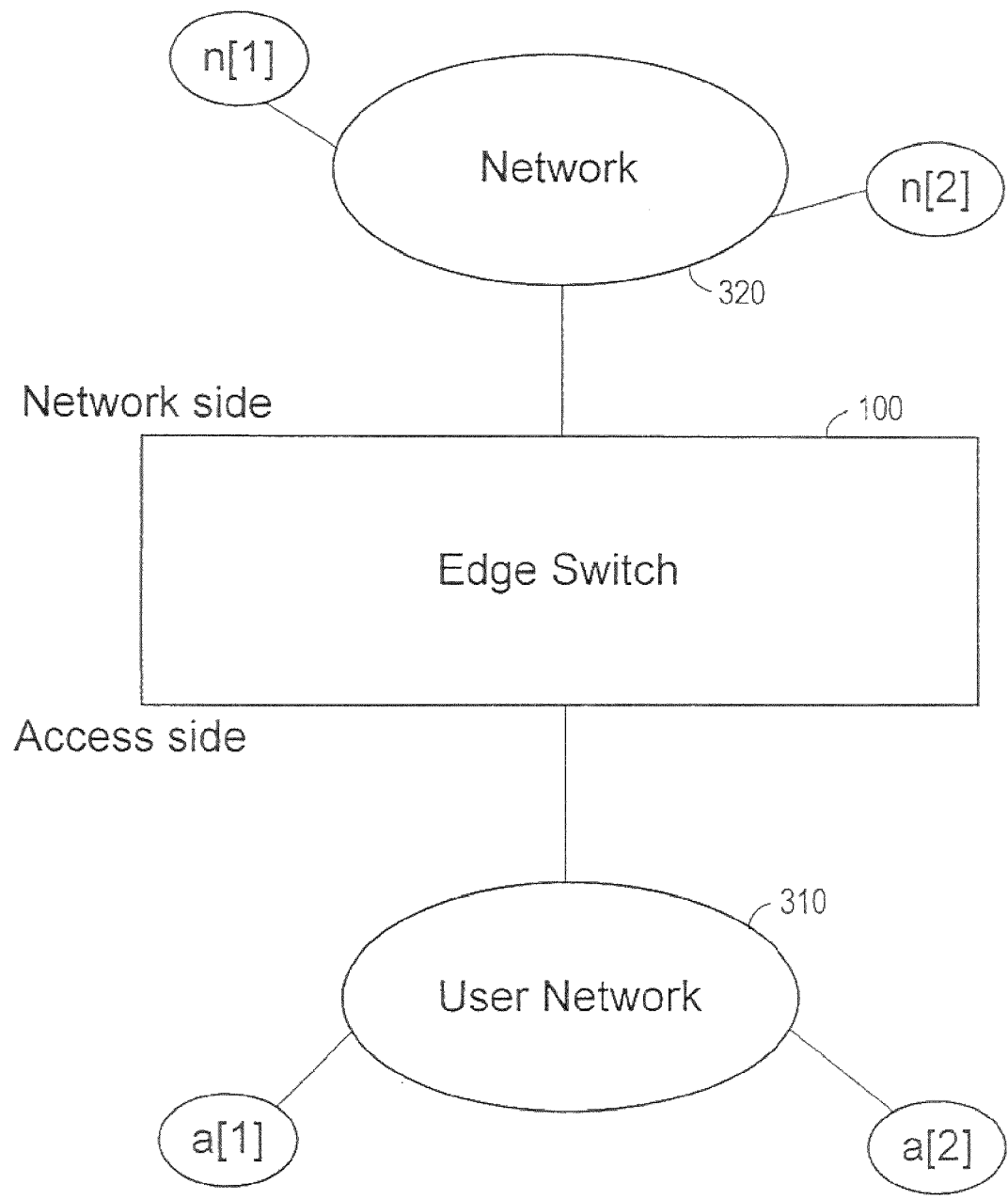
FIG. 3 is a block diagram of a generic edge switch connected to two networks.

FIG. 3 illustrates switch 100 in a typical connection configuration. Switch 100 is connected on the Access side to a User network 310 and on the Network side to an Upstream network 320. Switch 100 intelligently routes packets between the two networks. While the flow of data packets from the Access side to the Network side is described herein as an example, in some embodiments switch 100 is bi-directional, thus all of the data flows can be reversed for packets flowing from the Network side to the Access side.

Inside edge switch 100, the components are connected as shown by the solid lines in FIG. 1. Typically edge switch 100 is a Printed Circuit Board using a number of semiconductor component blocks, but all or any part of the described components could be integrated in to a single chip or across several chips.

First, there are a minimum of 2 FEs. A forwarding engine (FE) is a computational entity (which can be a general purpose CPU, FPGA, custom or off the shelf ASIC, or any other computational device) that performs packet-forwarding tasks. This entity usually includes associated memory devices for temporary and permanent storage of data, which could be internal or external, and at least 2 input/output ports connected to packet switched networks (e.g., Ethernet, ATM, Frame relay).

In general, a collection of Forwarding Engines defines a packet switch. For simplicity, only two FEs, FE 132 and FE 144, are shown. The invention allows moving all packet forwarding tasks from FE 132 to FE 144 with zero application disruption (and, consequently, no down time) in the system.

This can then be generalized to any arbitrary number of FEs (at least 2) that are connected in the same manner as shown by the solid lines in FIG. 1 and using multi-port switch chips Crossbar (A) 110 and Crossbar (N) 121.

Migrating a task in an application non-disruptive manner means that during the transition of a task from one forwarding entity to another: there is zero packet loss; the original sequence of packets is preserved and not re-ordered; and no duplicate packets are created.

In addition to the FEs, there is a Control Processor (CP) 156 which is connected as shown in FIG. 1. Note that CP 156 needs only one dedicated or shared communications link with FEs 132 and 144. For example, Crossbar (N) 121 can be shared with the FEs with forwarding traffic (as shown in FIG. 1), or a separate control traffic channel such as USB, Firewire or shared memory can be used. CP 156 can be any general purpose CPU connected to (i) a crossbar, Ethernet MAC, USB or Firewire interface, where such interface could be embedded or external, (ii) a bootflash memory, or other initialization device, and (iii) some SDRAM or other type of random access memory. It can be built with any general purpose operating system, such as Unix, which supports programmable Ethernet based object code.

The interconnection among the components of switch 100 is achieved by using Crossbar switch chips Crossbar (N) 121 and Crossbar (A) 110, as shown in FIG. 1. At most, 3 ports on each of these chips are consumed.

Both Switch (A) 110 and Switch (N) 121 have non-blocking full duplex bandwidth—meaning that for N ports each at b bits per second, the aggregate bandwidth of the crossbar exceeds 2bN bits per second and each port has full duplex bandwidth of 2b bits per second; transient congestion is not possible as a result of the interim flows created during task migration. Also, each crossbar port has a bandwidth either equal to or greater than the bandwidth of any single A side or N side port on the Edge Switch. For example, if an Edge Switch is to have A and N ports connecting to the outside world at 100 Mbps each, then the switched 110 and 121 must have internal ports that each exceed 100 Mbps, in each of two possible directions of traffic flow. An 8 port crossbar for this application will have N=8, b=100 million, yielding a required internal bandwidth of at least 1.6 Gigabits per second. Off the shelf packet crossbars meeting this criteria are available from Marvell, Broadcom and others (for example Marvell's GT48314 controller).

A crossbar switch can be constructed as an FPGA or ASIC, or purchased off-the-shelf as an ASIC, and has the following properties: non-blocking bandwidth, built-in end-node address table, where the addresses are of fixed (but arbitrary) length and the table is of a fixed size; destination addresses can be unicast or multicast; the crossbar can dynamically associate an address with the crossbar ports by observing the source address in packets which pass through the crossbar, and if for a given source address, this port changes in an observed packet, the address association inside the crossbar's address table is immediately updated to reflect this new port association; the crossbar operates in a "promiscuous mode" whereby it examines all packets received on any of its physical ports, regardless of the destination address (note that all FEs must be constructed with such a "promiscuous mode" when connecting to the crossbar); and the crossbar operates an address aging algorithm to delete old addresses that have not been used for a pre-defined period of time.

In this description we use fixed length 48-bit addresses in the Ethernet format as an illustrative example. It should be noted, however, that the methods described herein are equally applicable to any other addressing technique or scheme (e.g., ATM or Frame Relay VCs, MPLS labels, IPv4 or v6 addresses).

In cases where the end nodes use Ethernet style addresses, as in all IEEE 802 style networks, the Crossbar switches can be any N-port switched Ethernet chip (such as the Marvell GT 48314 chip). The remaining ports, which are unused in FIG. 1, can either remain unused (in which case we obtain a 2 port switch) or can be used to provide multi-port connectivity to the N side and A side network devices. For example, if an 8 port chip were used for Crossbar (N) 121 and Crossbar (A) 110, then there would be 5 ports on the N side switch and 6 ports on the A side available for external Ethernet based devices.

Figure 4:
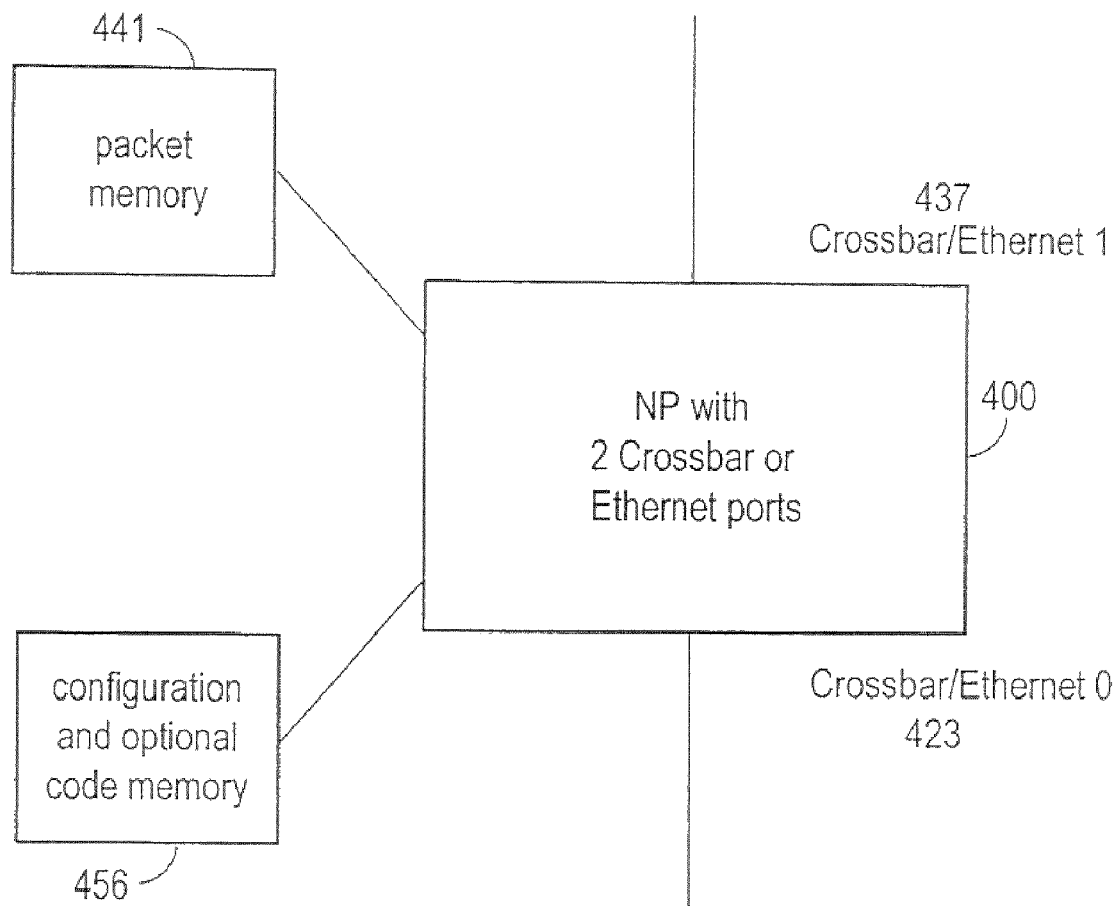
FIG. 4 is a block diagram of the functional components within a Forwarding Engine of FIG. 1.

FIG. 4 shows details of one possible implementation of an FE subsystem 400. In this example, SDRAM 441 is used for data, program and packet memory. A bootflash 456 is used for storing both power-on/reset code and security related network parameters. The basic element inside FE subsystem 400 is a programmable network packet processor (NP) 415 with at least 2 Ethernet MAC (Media Access Control) interfaces built in, Ethernet 423 and Ethernet 437. The speeds can be configured to be any power of 10 Mbps, or other standard, with 10 to the power of 4 being today's practical limit (10 Gbps). The switch is able to operate at an arbitrarily high speed with zero packet loss and no disruption to network applications. NP 415 also has the feature of a 32-bit clock register (CR-32) which NP 415 can sample at any time.

The NP ASIC shown here has an embedded CPU, built-in DMA for packet based peripherals such as Ethernet, and at least 2 Ethernet MAC engines. Examples of such a chip that are readily available are the AMD Alchemy Au1000 chip and the Motorola 8260 network processor (NP).

Initially, both FE 132 and FE 144 must have their Crossbar or Ethernet interfaces set to promiscuous mode. This is not required in CP 156.

The FE MAC addresses where CP 156 sends control packets are shown in Table 1 (note: in this description eth 0 is used to describe the Access (A) side, and eth 1, the Network (N) side).

TABLE 1

| F1E0: | 02-06-51-00-01-00 | FE 132, eth 0 |
| F1E1: | 02-06-51-00-01-01 | FE 132, eth 1 |
| F2E0: | 02-06-51-00-01-02 | FE 144, eth 0 |
| F2E1: | 02-06-51-00-01-03 | FE 144, eth 1 |

The FE MAC addresses used as sink MAC addresses for draining refresh packets are shown in Table 2.

TABLE 2

| F1S0: | 02-06-51-FE-01-00 | FE 132, eth 0 |
| F1S1: | 02-06-51-FE-01-01 | FE 132, eth 1 |
| F2S0: | 02-06-51-FE-01-02 | FE 144, eth 0 |
| F2S1: | 02-06-51-FE-01-03 | FE 144, eth 1 |

Each FE can be in any one of 4 states at any given time. There are two main states which are designated as Forwarding and Blocked. In addition, there are two transition states between the main states which are designated as Blocked→Fwd and Fwd→Blocked.

The method is illustrated by assuming a migration is needed from FE 132 to FE 144. Initially, FE 132 is the primary FE (in the Forwarding state) while FE 144 is the secondary FE (in the Blocked state). The task migration will move FE 132 from the Forwarding state through the Fwd→Blocked state to the Blocked state. FE 144 will be moved from the Blocked state through the Blocked→Fwd state to the Forwarding state. At the completion of the task migration, FE 144 will be the primary FE and FE 132 will be the secondary FE.

Figure 2:
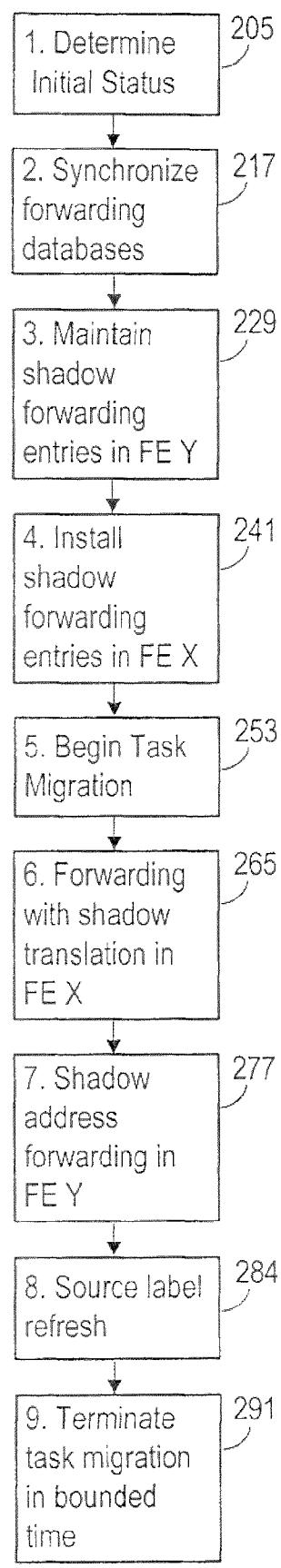
FIG. 2 is a flow diagram of a task migration process with zero packet loss and no disruption to network applications.

The process described in the flow diagram of FIG. 2 is performed using various control messages among FE 132, FE 144 and CP 156 to effect the application non-disruptive task migration. Exemplary control message formats used for one embodiment for an Ethernet packet switch are documented separately in Appendix A.

FIGS. 11A-11I illustrate the state of forwarding tables in each of Crossbar (A) 110, Crossbar (N) 121), FE 132 and FE 144 at various points in the task migration process, and the destination address of a packet 1113 traveling through switch 100 at those various points. Each line in the forwarding tables of Crossbar (A) 110 and Crossbar (N) 121 shows in the right-hand column the port (p1-p4) which is associated with a given source or destination address of a packet.

Likewise, for each line in the forwarding tables of FE 132 and FE 144 as represented in FIGS. 11A-11I, the middle column shows the port (N or A) that is associated with the address in the left-hand column. The right-hand column in the tables of FE 132 and FE 144 show any shadow translation which may be performed on the destination address during the task migration. The label on the heads of arrows indicates the destination MAC address of a packet traveling along that path and any label at the tail end of the arrows indicates the source address for that packet.

Figure 11A:
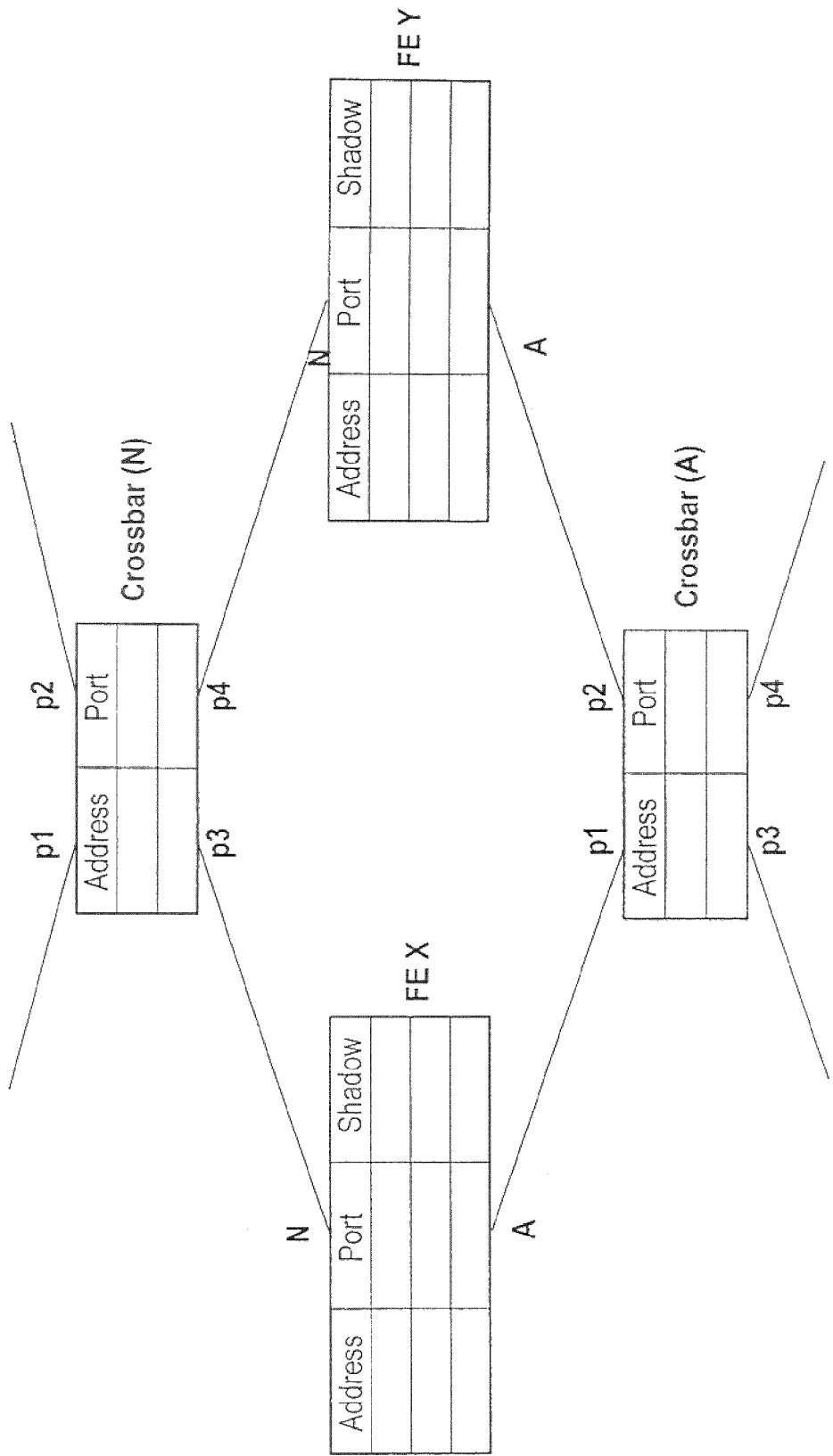
FIGS. 11A-11I are representations of the state of the forwarding tables in Crossbar (N), Crossbar (A), FE X and FE Y of FIG. 1 at different stages before, during and after the task migration process.
Figure 11B:
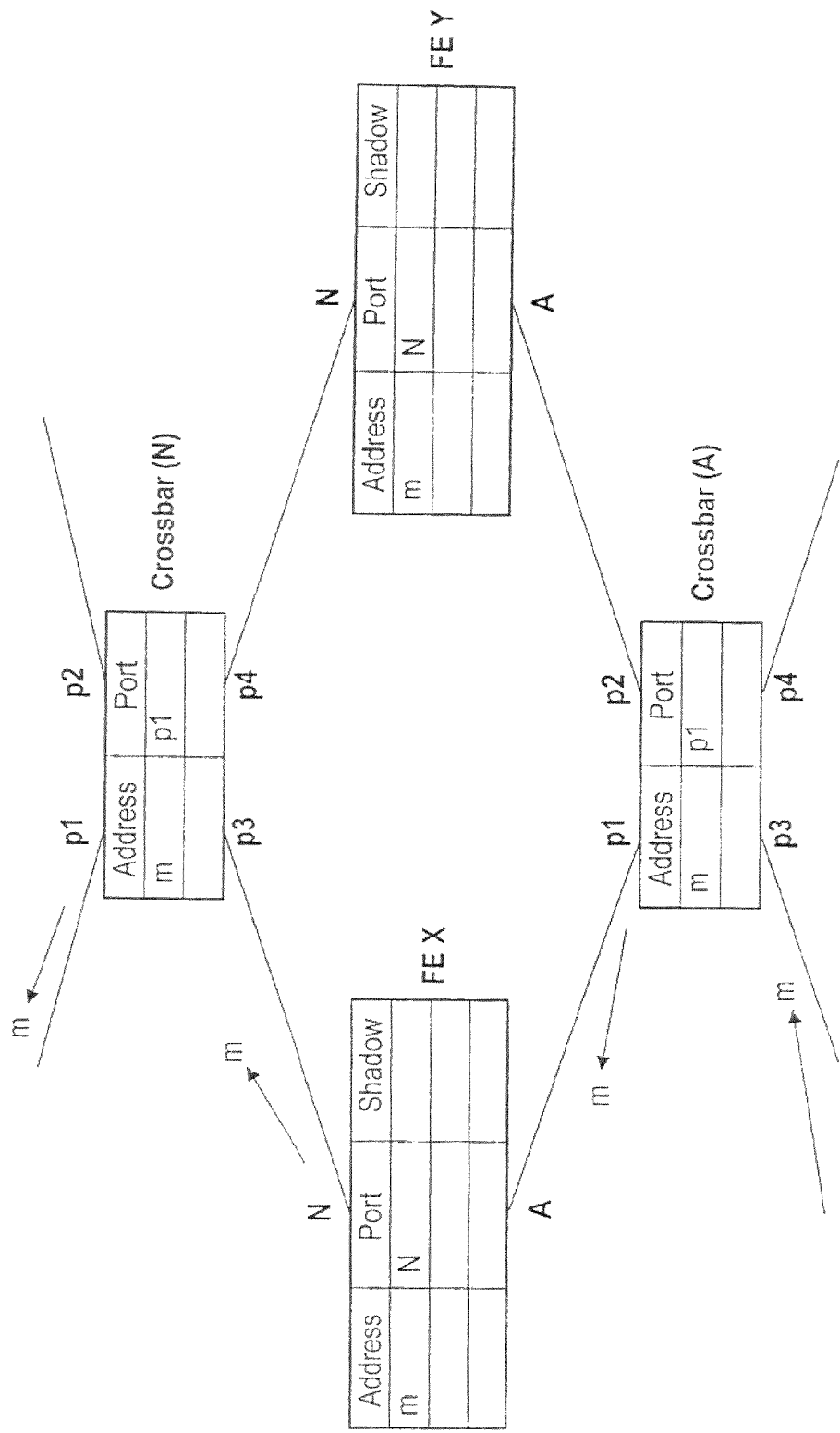

In the forwarding tables of FIGS. 11A to 11I, m is the original destination address as received originally at Crossbar (A) 110 and sh(m) is the shadow address corresponding to m. X means the packet 1113 will be forwarded to FE 132, Y means the packet 1113 will be forwarded to FE 144, N means the packet 1113 will be forwarded to Crossbar (N) 121 and D means the packet 1113 will be forwarded to the real destination of the packet. A <null> entry in a forwarding table is one that has no significant meaning. Prior to the start of the task migration process, the state of the forwarding tables is shown in FIG. 11A and a packet 1113 travels through switch 100 just through FE 132 as shown.

Figure 5:
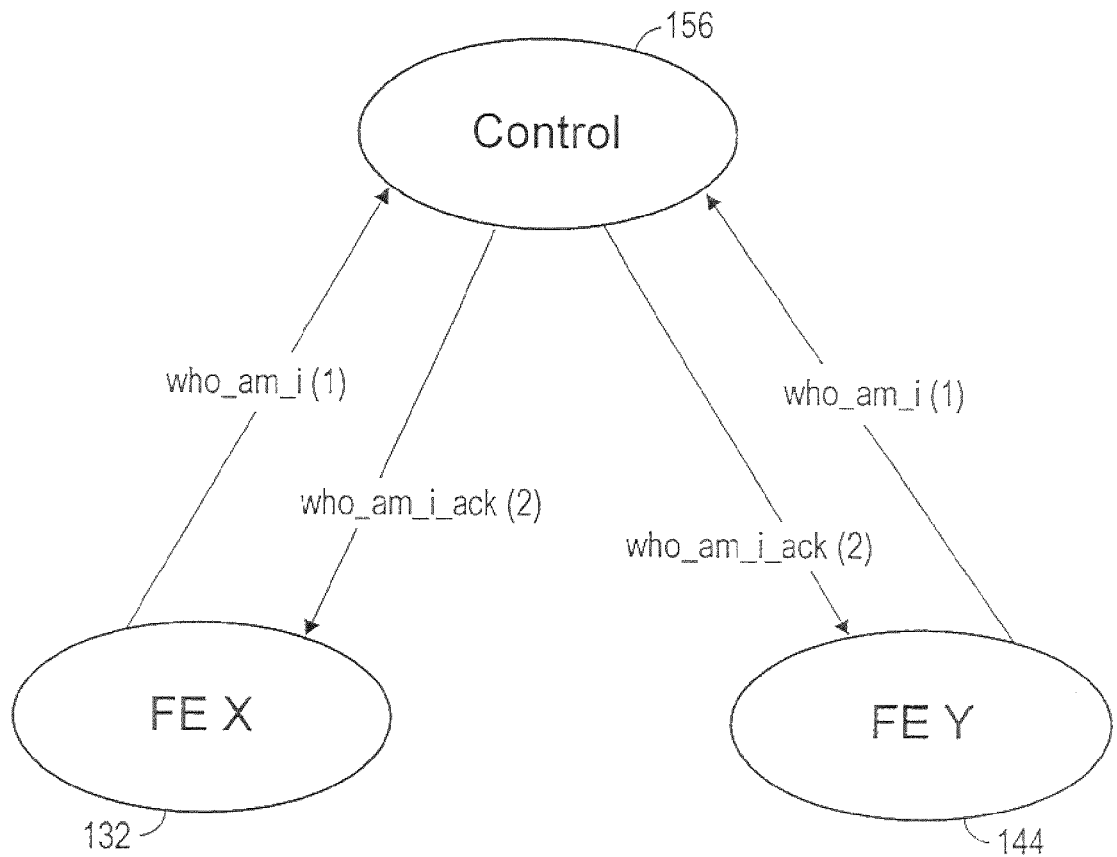
FIG. 5 is a finite state machine diagram of the initial basic message flow among FE X, FE Y and the CP of FIG. 1.
Figure 6:
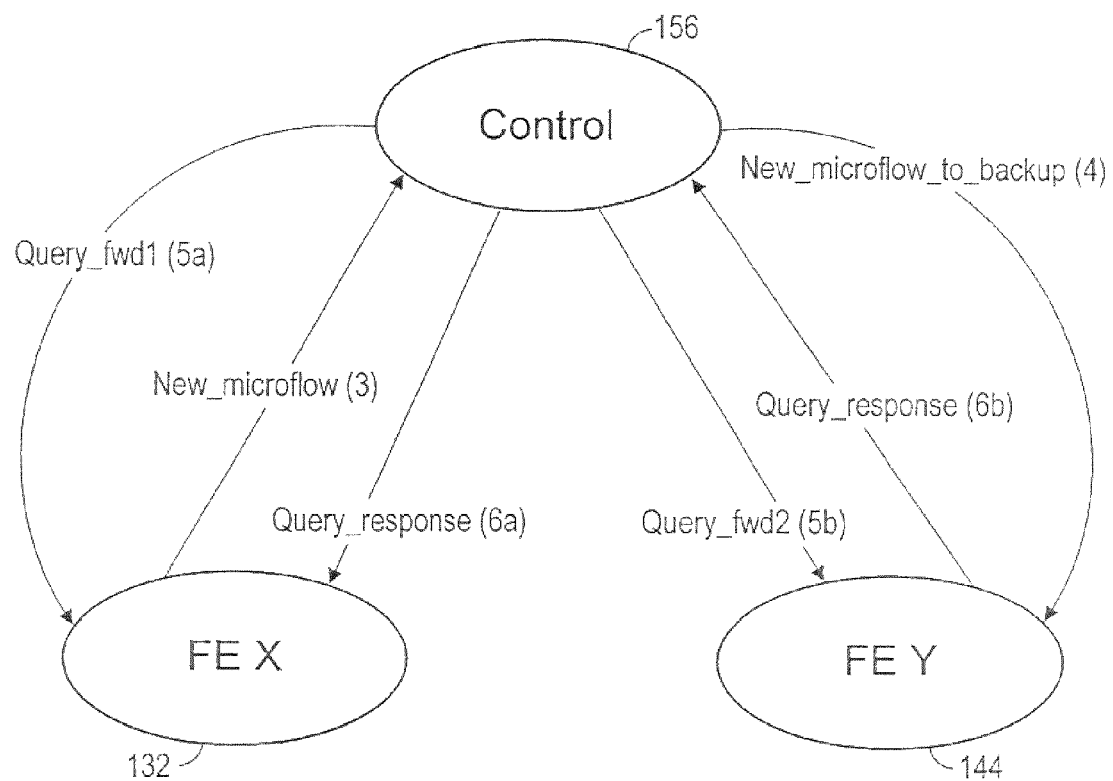
FIG. 6 is a finite state machine diagram of the message flow among FE X, FE Y and the CP of FIG. 1 to keep the MAC address forwarding tables synchronized and to establish shadow MAC address entries.
Figure 9:
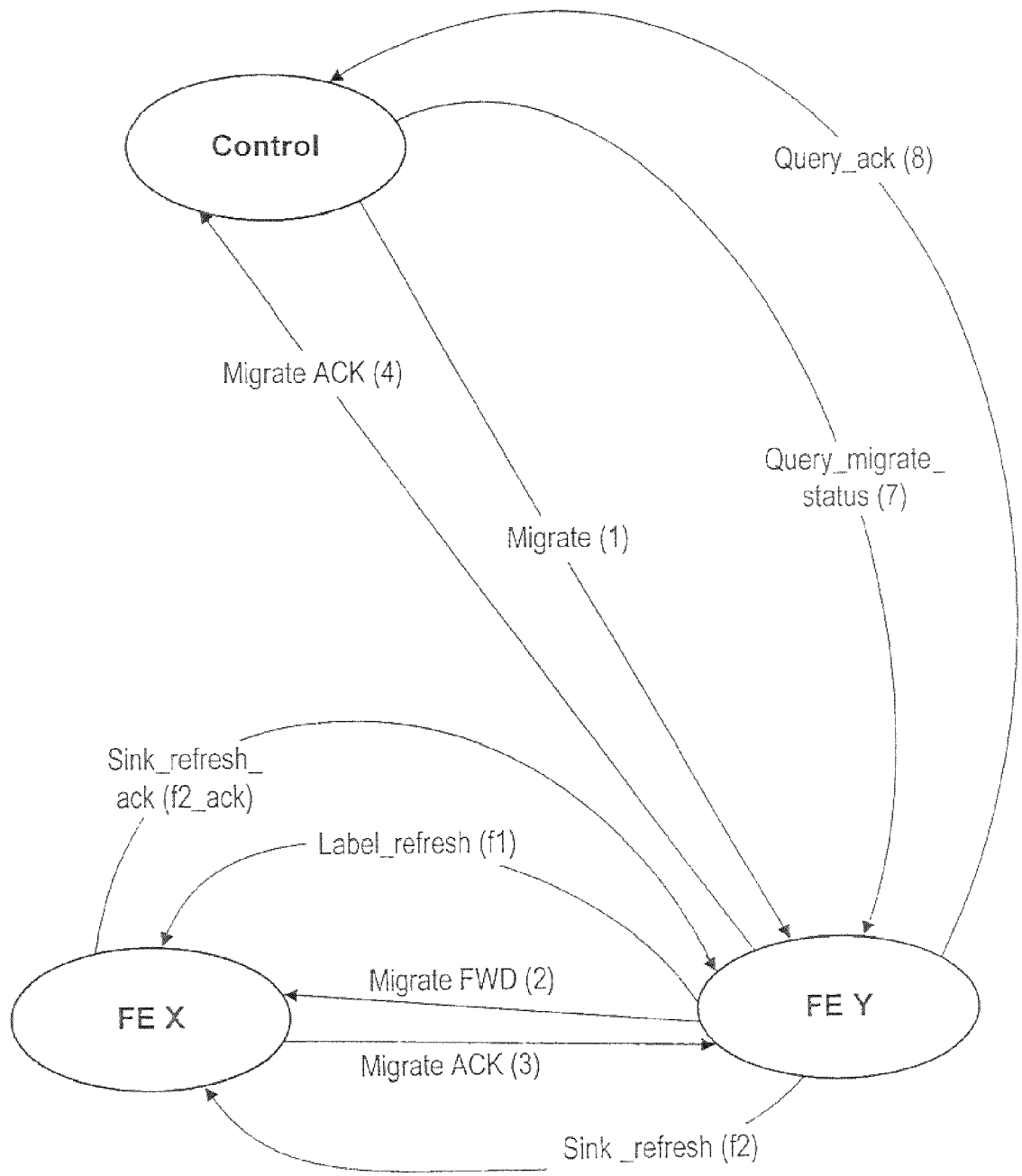
FIG. 9 is a finite state machine diagram of the message flow among FE X, FE Y and the CP of FIG. 1 to refresh source labels.
Figure 10:
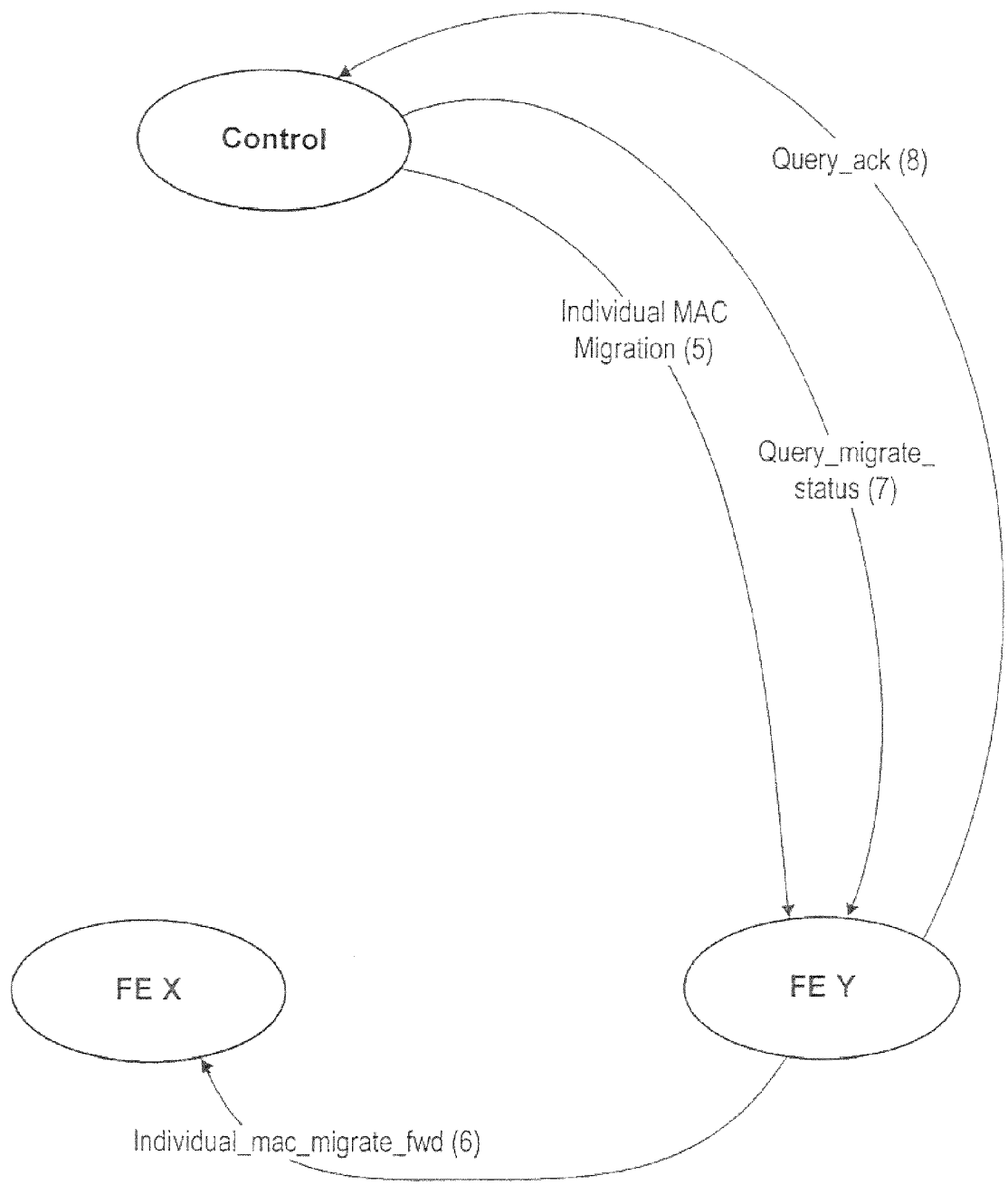
FIG. 10 is a finite state machine diagram of the message flow among FE X, FE Y and the CP of FIG. 1 to complete and terminate the task migration process.

FIG. 5 shows the initial message flow among CP 156, FE X 132 and FE Y 144. FE X 132 acts as primary NP and FE Y 144 acts as backup or secondary NP. This diagram only shows the initial basic message flow among different FEs 132 and 144 and CP 156.

Determine Status of FES at Reset Time (Step 205)

In response to who_am_i messages from an FE, CP 156 responds with a who_am_i_ack message of either Forwarding (meaning the FE is primary) or Blocked (meaning the FE is secondary). In our example, FE X 132 would receive the reply Forwarding, while FE Y 144 would receive a Blocked reply. FIG. 11A shows the initially empty forwarding tables of both X and Y.

Keep the Address Forwarding Database Synchronized (FE X→CP→FE Y) (Step 217)

Forwarding databases are built up using the well-known algorithm for source address learning by port—by observing the source address and the associated incoming port, the address-port association tables are constantly updated and built up. In addition, after 300 seconds of an address being inactive, it is aged out of the database. The additional step we perform is to organize the database so that it can be randomly accessed using a database record vector <row, column>, where row and column are 16 bit integers.

Each new MAC address by port at X 132 causes a new microflow report to be sent from X 132 to CP 156, and then sent from CP 156 to Y 144. This means that when a new source MAC address is learned by X 132, X 132 will send a report to CP 156, which stores the new database record vector. CP 156 then sends the message to Y 144, which updates the database in Y 144. The database record vectors are identified by physical memory buffers inside X32 organized as a rectangular array of "rows" and "columns". When X32 sends the new microflow report, it also includes a 32 bit sequence number in the message.

No acknowledgement is required for this message from X 132, as there is a second part to the synchronization step 217. For this second part, the CP 156 will issue periodic queries to the FEs for each FE's list of recently created database record vectors, and associated sequence numbers. CP 156 then waits for an answer, gets it (or retransmits queries until it gets an answer) and then checks its own database for any missing vectors. If there are missing vectors, CP 156 will query the FE for them, and retransmit these queries until it gets an answer. The presence of missing vectors is detected by the CP 156 by virtue of the sequence number algorithm; gaps in the sequence numbers reported by X 132 indicate that some new microflow messages were not received by the CP 156.

Through this 2-part mechanism, FE X 132 and CP 156 obtain synchronized databases. CP 156 is then responsible for synchronizing FE Y 144, which CP 156 accomplishes by continuously transferring these database records to FE Y 144. FIG. 11A-2 shows the forwarding tables of X and Y after Step 2.

Maintain Internal Shadow Forwarding Entries for Each Real Mac Address in FE Y, which is in Blocked State (Step 229)

The switch 100 makes use of internal shadow addresses which are stored in the forwarding tables of FE X 132 and FE Y 144 as shown in FIGS. 8A and 8B.

In the specific case of Ethernet, the upper 32 bits are used as a "fixed pattern" indicator of shadow MAC addresses, leaving the low order 16 bits and hence, at most 2 16 possible shadow MAC addresses. The upper 24 bits are the assigned block from IEEE (the example here uses Aspen Network Inc.'s assigned block), with the Local/Universal bit set to Local. The next 8 bits are a selector field, yielding 256 possible uses of a block; one of these 256 possible uses will be designated for shadow MAC addresses. The byte value 0xFF is assigned for shadow MAC addresses in our example.

In the more general case, sh( ) is a function that takes an arbitrary destination address m, and maps it to a unique shadow address, sh(m).

Figure 11C:
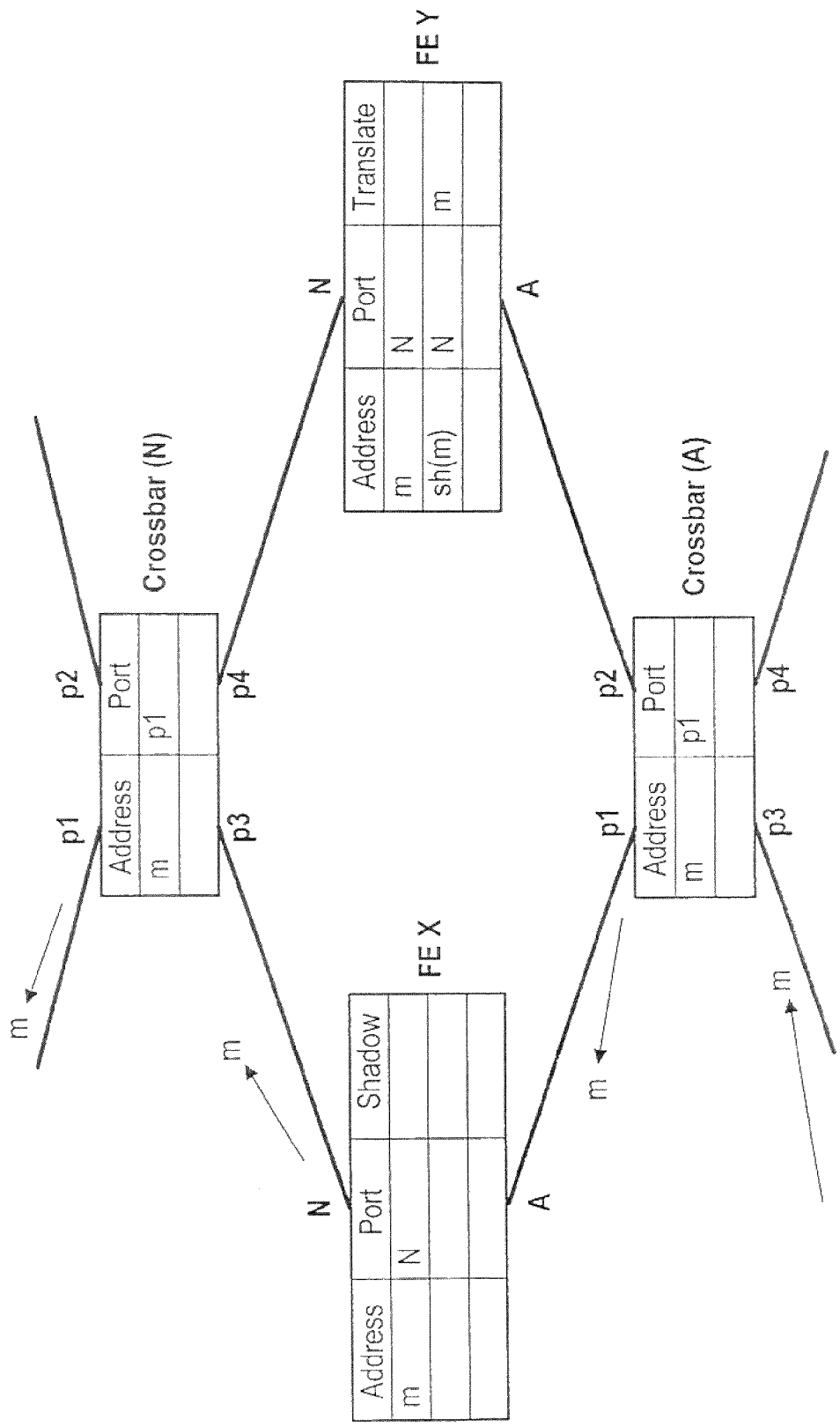

New MAC addresses are learned from X 132, via CP 156, through the new microflow reports sent to Y 144 as described in step 217. Y 144 must then perform the shadow MAC address allocation. Y 144 does so linearly from the space allocated. The shadow MAC addresses are used internally in the switch 100 during the task migration. FIG. 11C depicts the forward tables after Y creates its shadow entries.

Install Shadowport and Shadow Mac Address in X (Step 241)

For each new microflow report it receives, Y 144 builds the shadow MAC address forwarding entry, and then sends a control message to X 132 to install the shadow port and shadow MAC address in X's forwarding table. When sending this data to X 132, Y 144 must source the control packet using the shadow MAC address, shadow(m)=L, while using the assigned MAC address of X 132 that is used for control purposes as the destination address.

Figure 11D:
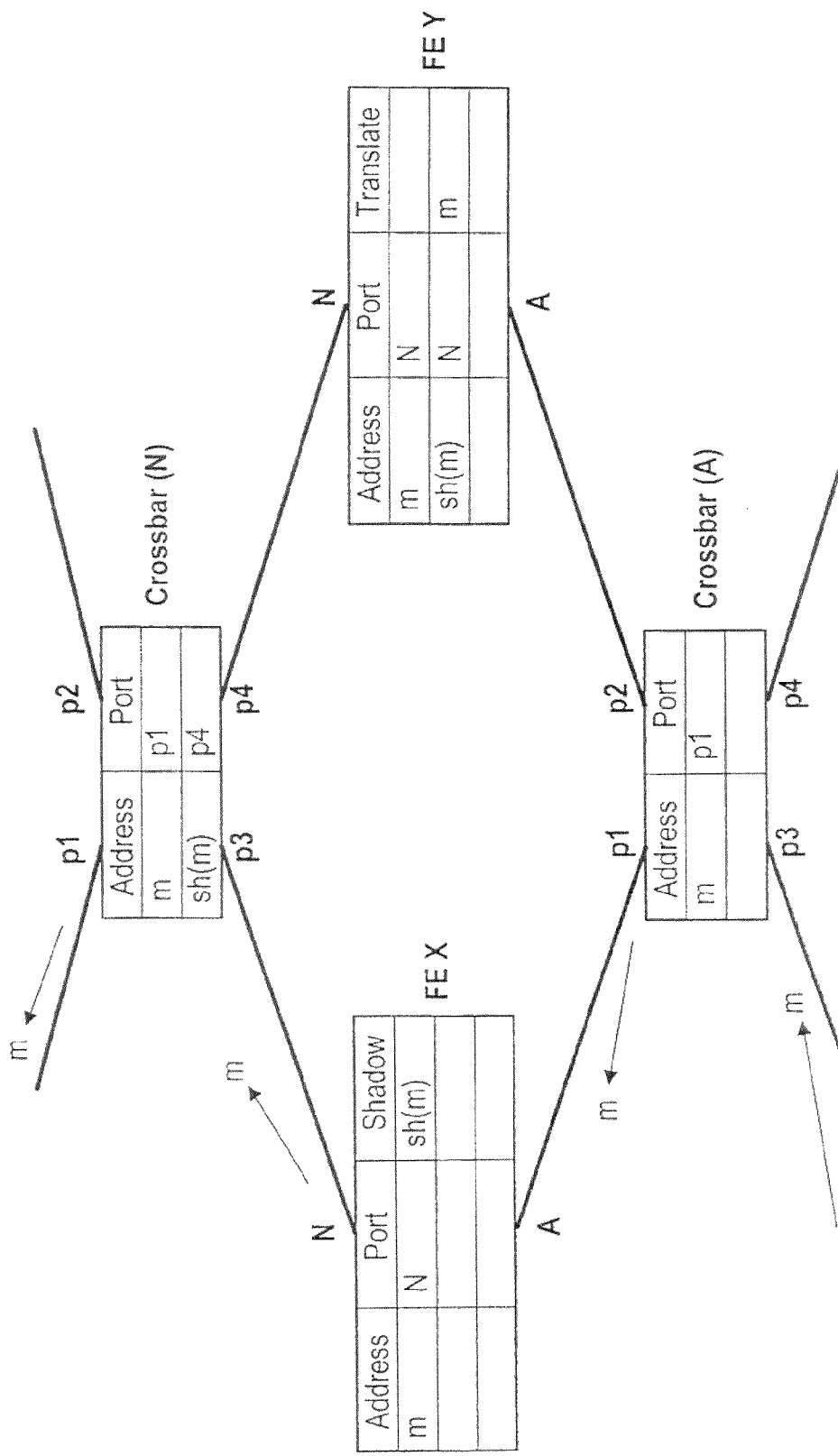
Figure 11E:
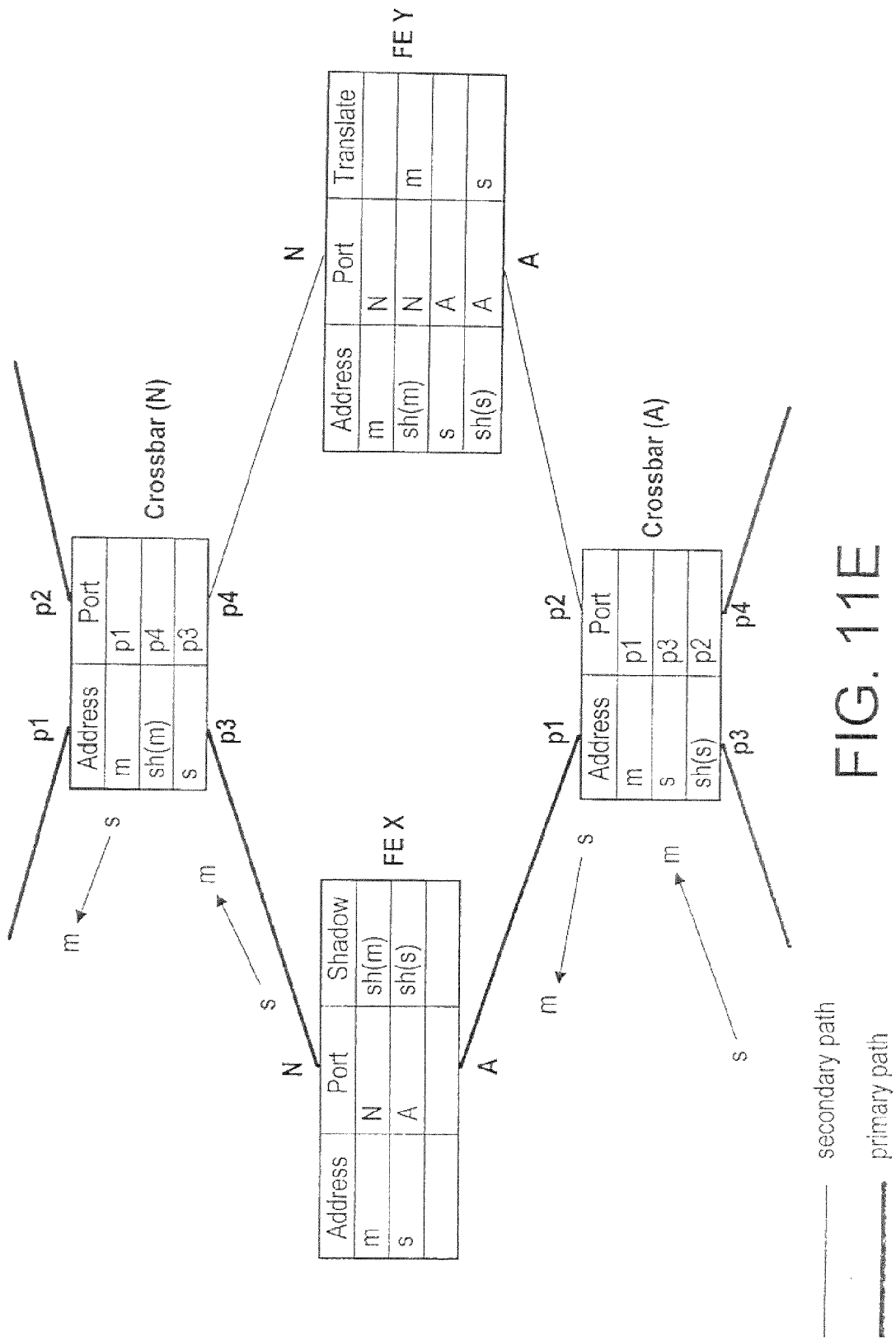
Figure 11F:
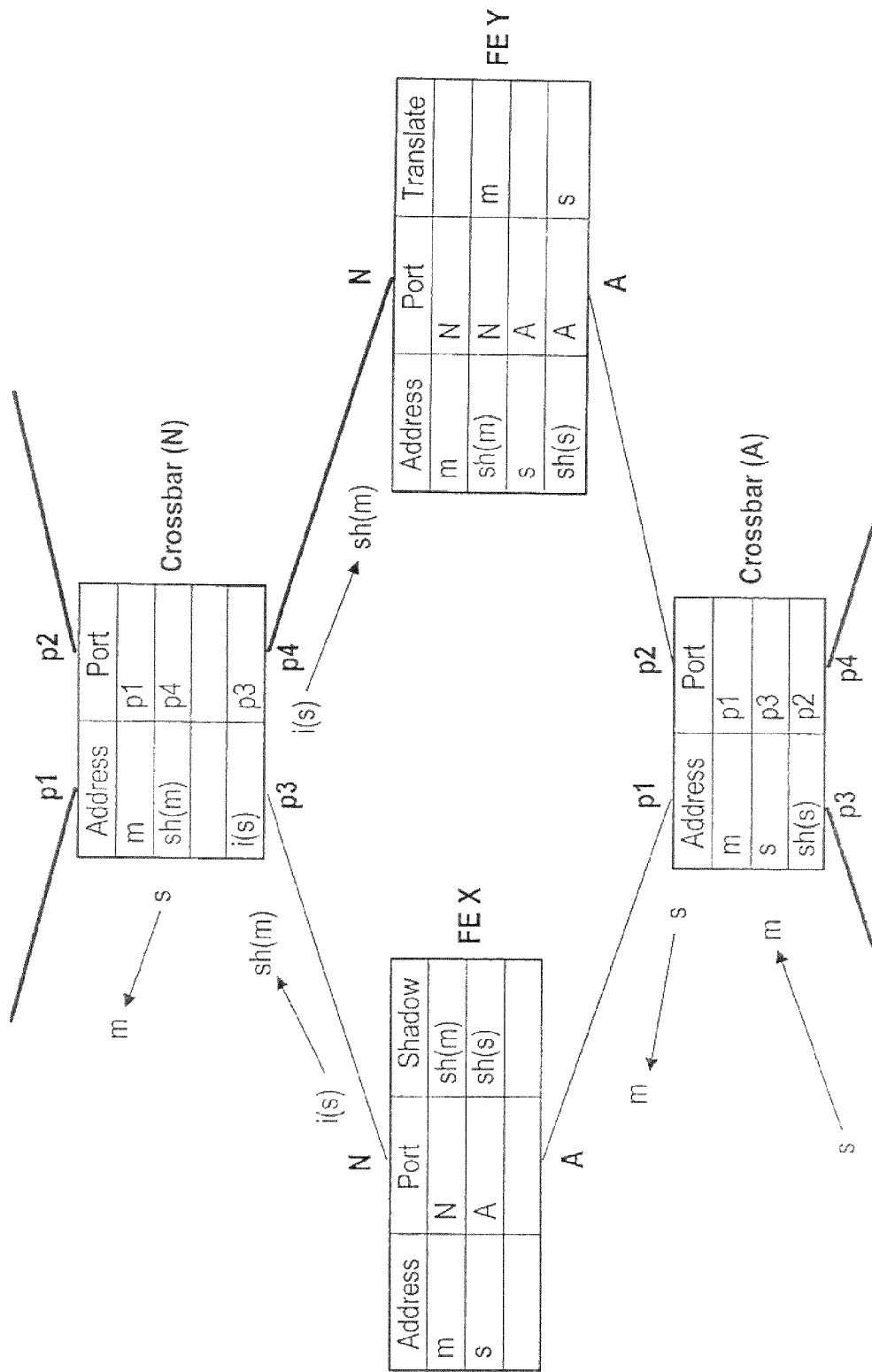

FIG. 11D shows the state of the forwarding tables, for destination address m, after executing Step 4 and 217, 229 and 241. All of the forwarding tables have been synchronized and updated, but task migration has not yet begun, so packet 1113 still travels just through FE X 132 as shown. FIG. 11E and FIG. 11F show the table states for both the source address s and destination address m.

Begin Task Migration (Step 253)

Through the appropriate CP user interface action by an administrator or an automated network management event, CP 156 will issue a Migrate (1) command to Y 144, instructing it to commence task migration from X 132 to Y 144. Y 144 will change state immediately to Blocked→Fwd and then send a control packet to X 132 with the Migrate FWD (2) command.

As soon as X 132 receives the Migrate FWD (2) command, it changes its state to Fwd→Blocked and sends a Migrate ACK (3) reply to Y 144. Y then sends a Migrate ACK (4) reply to CP.

As these messages are communicated among the components within the switch 100, specific changes take place in the internal states of FEs X 132 and Y 144 as shown in FIGS. 7A-7D.

FIG. 7A shows the state of X 132 and Y 144 prior to the Migrate (1) command. After it sends the Migrate FWD (2) command, Y 144 changes its state as shown in FIG. 7B by enabling real address forwarding without translation and enabling shadow address forwarding.

After it sends the Migrate ACK (3) command, X 132 changes its state as shown in FIG. 7C where new address learning is blocked, unknown unicast flood and multicast flood modes are disabled and real address forwarding is enabled with translation.

Finally, after the Migrate ACK (3) command is received by it, Y 144 changes its state so that new address learning is active and unknown unicast flood and multicast flood modes are enabled.

After Y 144 sends the Migrate ACK (4) to CP 156, CP 156 will then be responsible for termination of migration within a short, deterministic time frame (see section below on termination). Notice that while shadow address forwarding is still enabled on Y 144, termination of migration has not yet occurred.

Real Address Forwarding with Shadow Address Translation (Step 265)

The real address forwarding by X 132, with shadow address translation, is performed as follows: Starting with the real MAC address, X 132 performs the usual forwarding database lookup into the table shown in FIG. 8A for that MAC address. However, instead of using the Primary Port entry, X 132 will use the shadow MAC address entry. X 132 then replaces the destination address in the packet with the address L sh (m), which is the shadow MAC address. In addition, X 132 will flip bit 46 (the Universal/Local bit) in the source address—this function is called i(s), where i has a clear and well defined inverse, which is a second bit flip. Finally, X 132 transmits this modified packet out the same output port as it used before when forwarding using the real MAC address (i.e., without the shadow translation).

Shadow Address Forwarding (Step 277)

The modified packet sent from X 132 will be forwarded to Y 144 by Switch (N) 121. When that modified packet arrives, Y 144 will perform the following 2 steps:
  a. Replace the shadow address sh(m) in the destination field of the packet with the real address m.
  b. Flip bit 46 again, the inverse operation for i( ), which restores the real source MAC address.

In reviewing steps 253, 265 and 277 we see that an instantaneous state change occurs in FE X 132 that results in an alternate path being immediately used for any packets FE X 132 receives for forwarding, which is shown by the dashed path in FIG. 1. A packet that is normally forwarded out Port F1E1 will still go out Port F1E1, but its source address has been transformed using a function that has a clear inverse function (flipping bit 46), and its destination address has been replaced with a shadow address L=sh(m). Switch chips (A) 110 and (N) 121 have been programmed to route those shadow addresses to FE Y 144.

Original microflows of the form (represented by the solid arrows in FIG. 1):
  Src→Switch (A)→X→Switch (N)→Dest will now have the form (represented by the dashed arrows in FIG. 1):
  Src→Switch(A)→X→Switch(N)→Y and then from Y 4 Switch(N)→Dest and vice versa for microflows in the opposite direction.

Figure 11G:
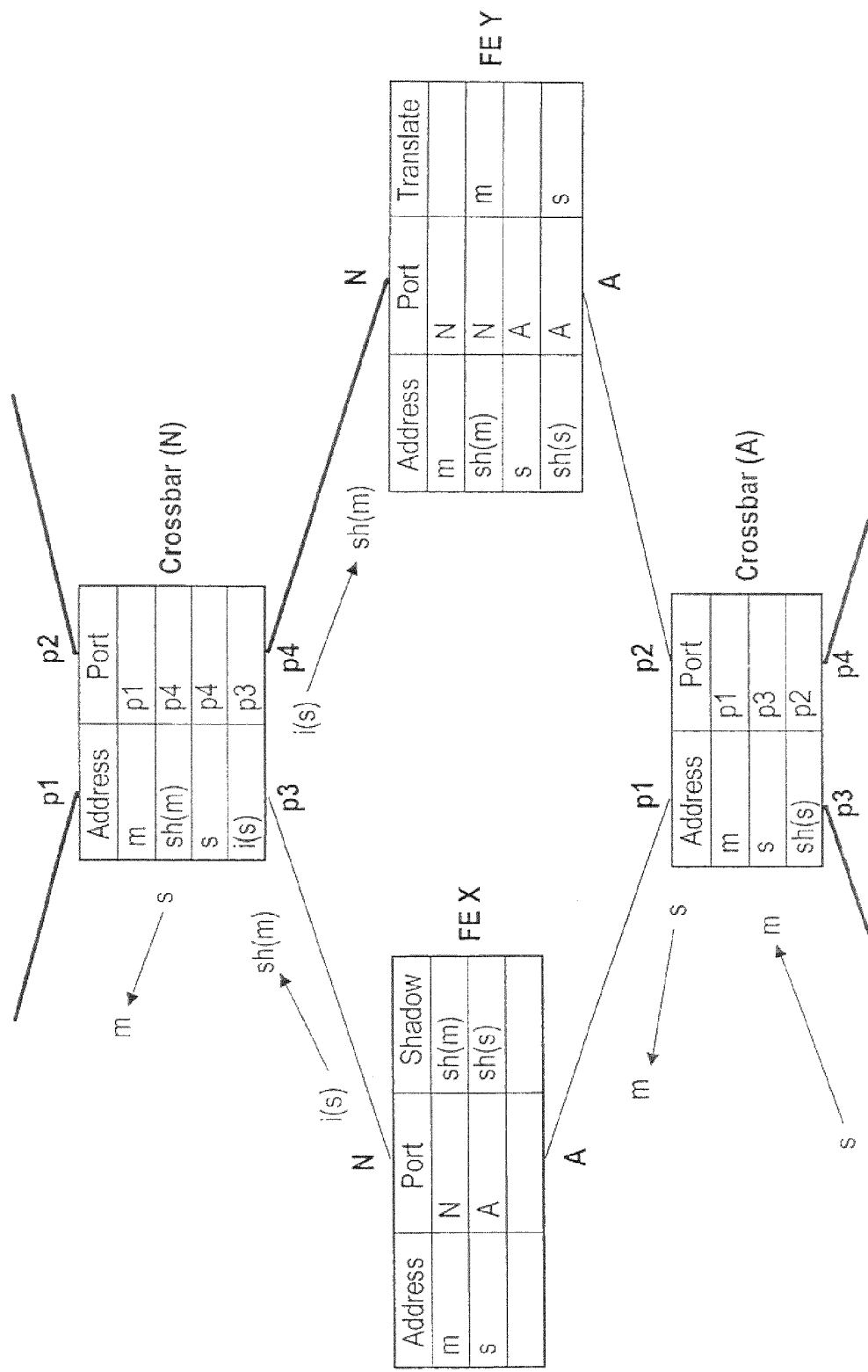
Figure 11H:
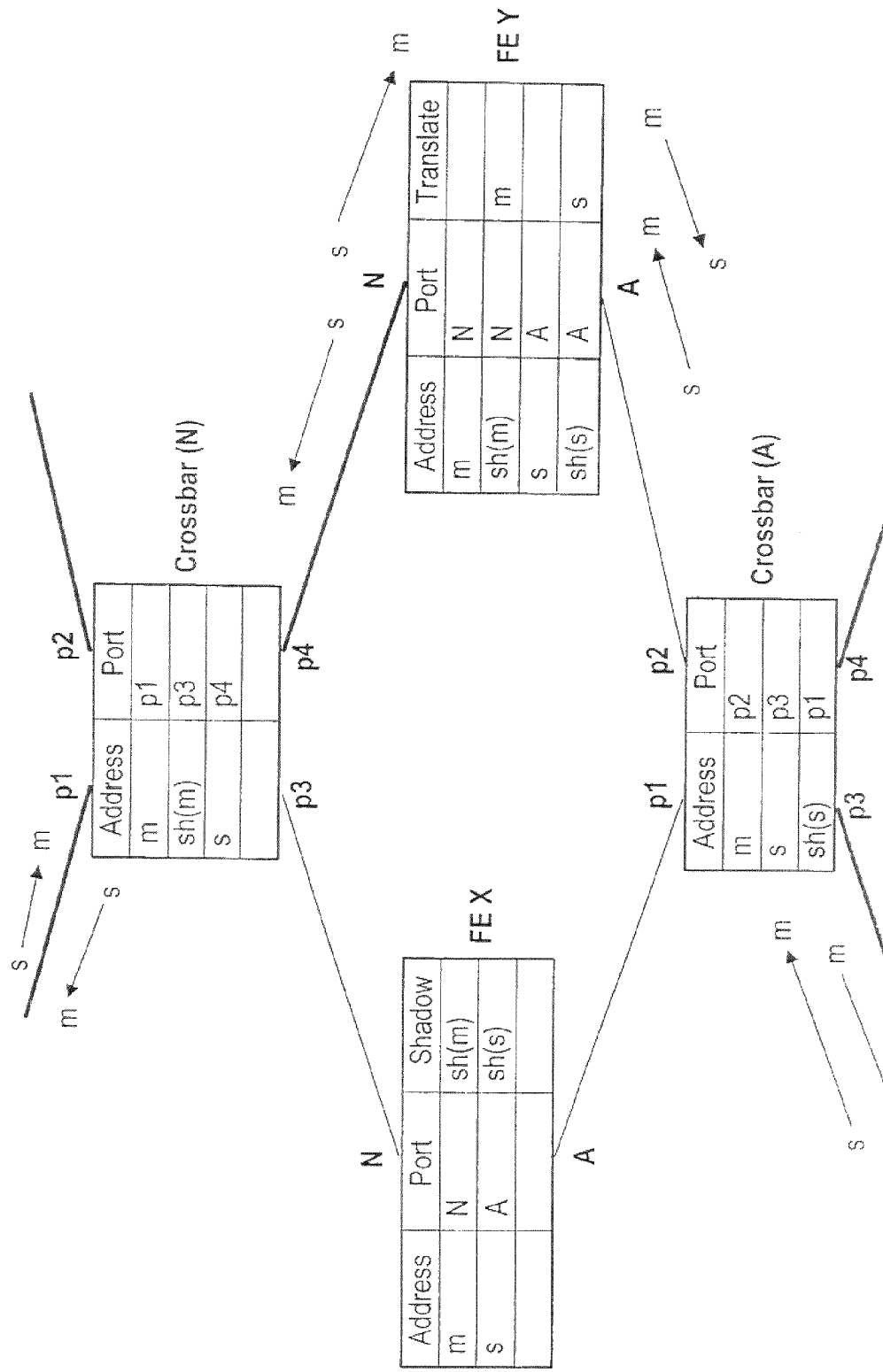

FIG. 11G shows this new microflow where a packet 1113 enters switch 100 and is forwarded to FE X 132. There, the packet's address is transformed into a shadow address and the packet 1113 forwarded to Switch (N) 121. Switch (N) 121 recognizes the shadow address and forwards the packet 1113 to FE Y 144. FE Y 144 then restores the original MAC address m and forwards packet 1113 to Switch (N) 121, which then forwards the packet 1113 to its destination.

There is zero packet loss, no reordering and no duplicates created (i.e. no application disruption) because:
  a. the alternate path for packets has been set up in advance, using shadow address forwarding (dashed arrows in FIG. 1);
  b. the transition occurs in the active FE X code at a well-defined instant shortly after the transition occurs in the passive FE Y code;
  c. both Switch (A) 110 and Switch (N) 121 have non-blocking full duplex bandwidth—meaning that for N ports each at b bits per second, the aggregate bandwidth of the crossbar exceeds 2bN bits per second and each port has full duplex bandwidth of 2b bits per second; transient congestion is not possible as a result of the interim flows created by task migration;
  d. a given flow s→m that is known in the database will always be routed by the crossbar to exactly one of X or Y during the transition, not both (hence no duplicates are possible, unlike some other approaches where multicast forwarding techniques are used with multiple FE5).
  e. with respect to crossbars N and A, once a source s has moved port associations within the crossbars, it does not move again during the transition (i.e. the source addresses do not flap around during the transition, and we ensure this by introducing the i(s), sh(m) address transformations in FE X.

Source Label Refreshes (284)

The backup or secondary FE must perform periodic refreshes at a rate in excess of 1 per 300 seconds for each label L (the shadow address). This accomplished as follows.

X 132 must pick a sink address pair; in this example 02-06-51-FE-00-00 is chosen for eth0 and 02-06-51-FE-00-01 is chosen for eth1. Y 144 should cause a refresh of these 2 addresses at least once every 300 seconds, while it is in backup mode. Y does this by sending a SINK request packet to both interfaces of X 132, each addressed to F1E0 and F1E1. X 132 then replies with source F1S0 and F1S1.

For each source address sh (m) in its label list, Y 144 should refresh by sending a null frame to the sink address pair F1S0 or F1S1, depending on which Ethernet interface of X 132 is appropriate. All X 132 has to do on receipt of this null frame is to drain the packets (i.e. discard them). When the primary FE X 132 becomes the secondary FE after the task migration, it will then be responsible for performing these source label refreshes.

FIG. 11D shows the states of the forwarding tables after the source label refreshes. In particular, the forwarding table in Crossbar (A) 110 has been updated so that packets 1113 are now forwarded to FE Y 144, not FE X 132.

Task Management Termination by CP (Step 291)

Some addresses may be sleeping and not active within a short time window after commencement of migration, meaning no traffic microflows are active in the time window using these addresses. In these cases, active termination by CP 156 is required so that X 132 is effectively "emptied" in a short time and all of its tasks are migrated to Y 144. After the Migrate ACK (3) is sent by X 132, and the Migrate ACK (4) is sent by Y 144 to CP 156, and after waiting for a configurable period of T milliseconds (with a default value of T=500 milliseconds) CP 156 begins the termination phase.

CP 156 will always have a list of all known MAC addresses since it takes part in forwarding database synchronization information among the FEs in step 217. For each MAC address m in the list, CP 156 commences termination by sending a separate control packet to the unicast control address of Y 144 requesting Y 144 to migrate MAC address m. The database record vector for looking up MAC address m is included in this control packet. CP 156 must observe an interval between packets which is not less than 1 millisecond.

Y 144 will then send a packet to the appropriate sink address of X 132 with a source address=m, sending the packet out the appropriate A or N port. This allows either Switch (A) 110 or Switch (N) 121 as the case maybe, to learn that the new port association for MAC address=m is FE Y 144 and that MAC address m is no longer associated with FE X 132. Note that as long as Y 144 successfully completes transmission of the packet out to the switch, the intended effect of switch learning takes place.

In the forwarding database in the FEs, a field is added which tracks the Migrated Status for each known real MAC address. Every time Y 144 migrates an address m in the manner described above, it must set the Migrated Status Boolean to 1. This is part of a reliable message delivery protocol that takes care of any possibly lost packets from CP 156 to Y 144.

After CP 156 sends the sequence of "migrate m" requests, it should query Y 144 for each MAC address m for the Migrated Status bit associated with that address m. This is to satisfy CP 156 that the migration for that address m has completed. As long as some replies to these queries arrive with Migrate Status=0, the process has not terminated, and CP 156 will need to repeat the migrate termination sequence for all such entries.

Figure 11I:
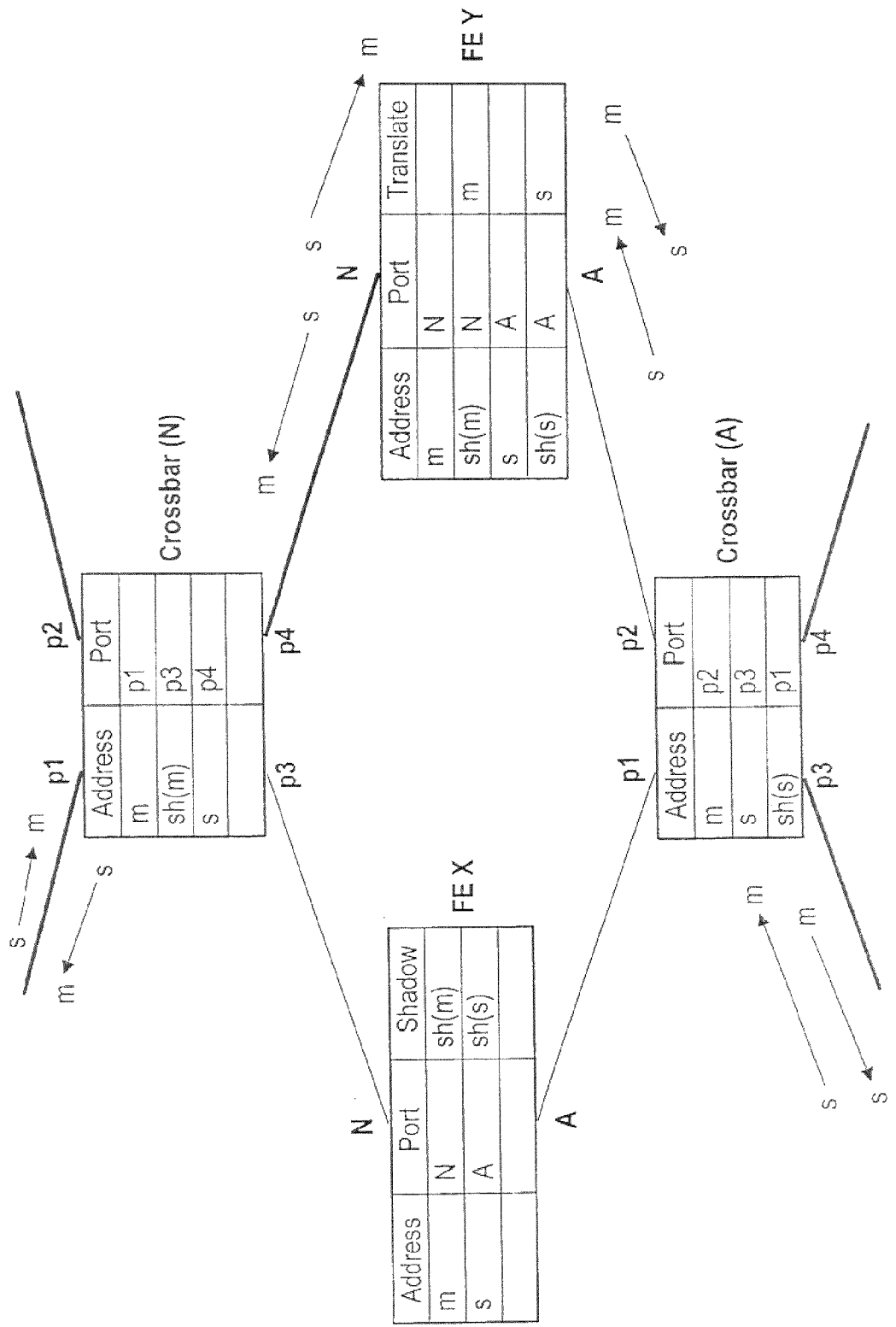

Once satisfied that the migrate has completed, CP 156 must send to Y 144 a final control packet to restore its state to a full Primary. Namely, the flag variable for shadow address forwarding in Y's internal state must be set to Disabled. At this point, X 132 is in state Blocked and Y 144 is in state Forwarding and the task migration is complete. FIG. 11E shows that final states of the forwarding tables after termination of task migration. Note that FE Y 144 has now completely taken the place of FE X 132 in the switch 100. The final forwarding tables after step 9 are shown in FIG. 11I.

Embodiments described above illustrate but do not limit the invention. In particular, the invention is not limited any specific circuitry used to implement the network switch. In fact, any suitable network switch known in the art to perform the functions described herein can be used in accordance to the principles of the invention. In addition, the invention is not limited to any particular hardware/software implementation. Those skilled in the art realize that alternative hardware software implementations can be employed in lieu of the one described herein in accordance to the principles of the present invention. Other embodiments and variations are within the scope of the invention, as defined by the following claims.

APPENDIX A

Message Formats

The following message formats are only shown here to depict the realization of the invention in practice. These are packet formats as seen on an Ethernet link, and it is important to note that these formats are not central to the claims. A message can be sent on a wire in an infinite variety of formats. However, the essential contents and meanings of the messages, and the overall set of messages are central to the claims.

Messaging among CTL, FE X and FE Y follows the frame protocol syntax below:

| DA | SA | Ether Type | A** | Protocol | Cmd | B** | C** | D** | Payload | E** |
|----|----|-----------|-----|----------|-----|-----|-----|-----|---------|-----|

**= these fields are used for control functions not described in this document

Where:

| | | |
|---|---|---|
| DA | Destination Address | 6 bytes |
| SA | Source Address | 6 bytes |
| Ether Type | Ether Type - can be any fixed number | 2 bytes |
| Protocol | code point for messaging | 1 byte |
| Cmd | additional code point for messaging | 2 bytes |
| Payload | Extended payload for messaging | n bytes |

Note that the addresses below, when used in the DA and SA fields, have the following meanings:

FWD the appropriate assigned MAC addresses for the FEs X or Y

CTL the unique MAC address of the CP

Initial Message Flow 1) who_am_i (1)

| CTL | FWD | 0x02 | 0x02 |
|---|---|---|---|

2) who_am_i_ack(2)

| FWD | CTL | 0x02 | 0x04 | payload |
|---|---|---|---|---|

Payload can be 0x01, 0x02, etc. depending upon whether the request was received from FWD1 or FWD2, or, in general, FWD N.

Database Synchronization 1) new_microflow(3)

| CTL | FWD | 0x01 | 0x01 | payload |
|---|---|---|---|---|

Where payload is:

| MAC address | 6 bytes |
|---|---|
| Port | 1 byte |
| Action | 1 byte (forwarding) |
| Row index | 2 bytes |
| Col index | 2 bytes |
| Sequence Number | 4 bytes |

2) newmicroflow_to_backup (4)

| CTL | FWD | 0x01 | 0x01 | payload |
|---|---|---|---|---|

Where payload is:

| MAC address | 6 bytes |
|---|---|
| Port | 1 byte |
| Action | 1 byte (blocked) |
| Row index | 2 bytes |
| Col index | 2 bytes |

13) sync_bridge(13)

After an FE resets or reloads its code on command, it sends a who_am_i to the CP, and after the CP replies to the request with a who_am_i_ack, the CP sends a sequence of sync_bridge 30 frames to ensure forwarding table synchronization.

| FWD | CTL | 0x01 | 0x06 | payload |
|---|---|---|---|---|

Where payload is:

| MAC address | 6 bytes |
|---|---|
| Port | 1 byte |
| Action | 1 byte (blocked) |
| Row index | 2 bytes |
| Col index | 2 bytes |

14) label_refresh (f1)

This message is sent by Y if Y is backup (in preparation for a migrate command to be received).

| DST | SRC | 0x01 | 0x0e |
|---|---|---|---|

DST is the refresh Sink (on X)
SRC is the Shadow Label (from Y)

15) sink refresh_request (from Y)

| DST | SRC | 0x04 | 0x01 |
|---|---|---|---|

DST is the Sink Address
SRC is the FE Y MAC address 16) sink refresh_ack (f2_ack)

| DST | SRC | 0x04 | 0x02 |
|---|---|---|---|

DST is FWDn
SRC is the Sink address.

Migration Message Flow Among CP, FE X and FE Y 1) migrate

This command is sent from the CP to FE Y.

| FWD | CTL | 0x01 | 0x0b |
|---|---|---|---|

2) migrate_fwd

This command is sent from FE Y to FE X.

| FE Y | FE X | 0x01 | 0x0a |
|---|---|---|---|

3) migrate_ack(3)

This command is sent from FE X to FE Y.

| FE Y | FE X | 0x01 | 0x08 |
|---|---|---|---|

4) migrate_ack(4)

This command is sent from FE Y to the CP.

| CTL | FE X | 0x01 | 0x08 |
|---|---|---|---|

5) individual_mac_migration (5)

This command is sent from the CP to FE Y.

| CTL | FWD | 0x01 | 0x07 | payload |
|---|---|---|---|---|

Payload consists of the following 8 bytes:

| Row | 2 bytes |
|---|---|
| Col | 2 bytes |
| Action | 1 byte |
| padding | 3 bytes |

6) individualmacmigrate_fwd(6)

This command is sent from FE Y to FE X.

| FWD X | FWD Y | 0x01 | 0x09 | payload |
|---|---|---|---|---|

Payload consists of:

| Row | 2 bytes |
|---|---|
| Col | 2 bytes |

7) query_migrate_status (7)

This command is sent from the CP to FE Y.

| FWD | CTL | 0x01 | 0x0c | payload |
|---|---|---|---|---|

Payload consists of:

| Row | 2 bytes |
|---|---|
| Col | 2 bytes |

8) Migrate_status_query_ack (8)

| CTL | FWD | 0x01 | 0x01 | payload |
|---|---|---|---|---|

Payload consists of:

| Row | 2 bytes |
|---|---|
| Col | 2 bytes |
| Action | 2 byte |
| | 0x01 = Blocked |
| | 0x02 = Fwd |
| | 0x03 = Migrated |

I claim:

1. A network switch comprising:
a first forwarding engine;
a second forwarding engine;
a control processor;
wherein the control processor migrates packet traffic to be routed to a destination by the first forwarding engine to the second forwarding engine, and wherein the second forwarding engine routes packets of the packet traffic to the destination with no datagram reordering.

2. A network switch comprising:
a first forwarding engine;
a second forwarding engine;
a control processor;
wherein the control processor migrates packet traffic to be routed to a destination by the first forwarding engine to the second forwarding engine, and wherein the second forwarding engine routes packets of the packet traffic to the destination with no datagram duplication.

3. A method of routing packet traffic via a network switch comprising a first forwarding engine, a second forwarding engine and a control processor, the method comprising:
the control processor migrating packet traffic to be routed to a destination by the first forwarding engine to the second forwarding engine, wherein the second forwarding engine mutes packets of the packet traffic to the destination with no datagram reordering.

4. A method of routing packet traffic via a network switch comprising a first forwarding engine, a second forwarding engine and a control processor, the method comprising:
the control processor migrating packet traffic to be routed to a destination by the first forwarding engine to the second forwarding engine, wherein the second forwarding engine routes packets of the packet traffic to the destination with no datagram duplication.

\* \* \* \* \*

UNITED STATES PATENT AND TRADEMARK OFFICE
CERTIFICATE OF CORRECTION

PATENT NO. : 8,059,644 B2  
APPLICATION NO. : 12/581091  
DATED : November 15, 2011  
INVENTOR(S) : Bhaskaran Page 1 of 1

It is certified that error appears in the above-identified patent and that said Letters Patent is hereby corrected as shown below:

On the Title Page, Item [60] should read,

Continuation of Application No. 10/317,809, filed on Dec. 11, 2002, now Pat. No. 7,620,040.

Signed and Sealed this  
Twenty-sixth Day of November, 2013

Margaret A. Focarino  
*Commissioner for Patents of the United States Patent and Trademark Office*